(12) United States Patent
Mu

(10) Patent No.: US 12,262,317 B2
(45) Date of Patent: Mar. 25, 2025

(54) METHOD AND DEVICE FOR TRANSMITTING DATA BASED ON GRANT-FREE UPLINK SCHEDULING, AND STORAGE MEDIUM

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 473 days.

(21) Appl. No.: 17/626,049

(22) PCT Filed: Jul. 10, 2019

(86) PCT No.: PCT/CN2019/095476
§ 371 (c)(1),
(2) Date: Jan. 10, 2022

(87) PCT Pub. No.: WO2021/003713
PCT Pub. Date: Jan. 14, 2021

(65) Prior Publication Data
US 2022/0256457 A1    Aug. 11, 2022

(51) Int. Cl.
*H04W 52/02*    (2009.01)
*H04L 1/08*    (2006.01)
(Continued)

(52) U.S. Cl.
CPC .......... *H04W 52/0216* (2013.01); *H04L 1/08* (2013.01); *H04L 5/0053* (2013.01); *H04W 52/0229* (2013.01); *H04W 72/1268* (2013.01)

(58) Field of Classification Search
CPC ......... H04W 52/0216; H04W 52/0229; H04W 72/1268; H04W 72/20; H04W 72/52;
(Continued)

(56) References Cited

U.S. PATENT DOCUMENTS

2013/0235776 A1*  9/2013  Park ................... H04W 52/0229
                                                                370/311
2018/0123765 A1*  5/2018  Cao ....................... H04L 1/1819
(Continued)

FOREIGN PATENT DOCUMENTS

CN          109586853 A        4/2019

OTHER PUBLICATIONS

European Patent Application No. 19937033.9, Office Action dated Mar. 24, 2023, 7 pages.
(Continued)

*Primary Examiner* — Ayanah S George
(74) *Attorney, Agent, or Firm* — Cozen O'Connor

(57) ABSTRACT

A method for transmitting data based on grant-free uplink scheduling. The method is performed by a terminal. The method includes: listening, based on a first listening parameter, an acknowledgement on uplink data from a base station, during a process of transmitting the uplink data based on a target number of repeat transmissions through a grant-free uplink scheduling mechanism, the acknowledgement being configured to indicate a successful reception of the uplink data; and terminating transmitting the uplink data in response to that the acknowledgement is listened before a completion of transmitting the uplink data based on the target number of repeat transmissions.

17 Claims, 6 Drawing Sheets

(51) Int. Cl.
*H04L 5/00* (2006.01)
*H04W 72/1268* (2023.01)

(58) Field of Classification Search
CPC ...... H04W 72/535; H04L 1/08; H04L 5/0053; H04L 1/1864
See application file for complete search history.

(56) References Cited

U.S. PATENT DOCUMENTS

2019/0081741 A1* 3/2019 Al-Imari ............... H04L 1/1671
2019/0097762 A1  3/2019 Jeon et al.

OTHER PUBLICATIONS

Chinese Patent Application No. 201980001347.9, Office Action dated Jun. 6, 2022, 6 pages.
Chinese Patent Application No. 201980001347.9, English translation of Office Action dated Jun. 6, 2022, 8 pages.
PCT/CN2019/095476 English translation of International Search Report dated Mar. 31, 2020, 2 pages.
European Patent Application No. 19937033.9 extended Search and Opinion dated Jun. 22, 2022, 9 pages.

\* cited by examiner

METHOD AND DEVICE FOR TRANSMITTING DATA BASED ON GRANT-FREE UPLINK SCHEDULING, AND STORAGE MEDIUM

CROSS-REFERENCE TO RELATED APPLICATION

This application is a national phase of International Patent Application No. PCT/CN2019/095476, filed on Jul. 10, 2019, the entire content of which is incorporated herein by reference.

TECHNICAL FIELD

The disclosure relates to the field of wireless communication technologies, and more particularly, to a method and a device for transmitting data based on grant-free uplink scheduling and a storage medium.

BACKGROUND

Internet of Things (IoT) devices in a scenario of IoT usually have requirements for uplink grant-free scheduling because the amount of data transmitted in each uplink is relatively small.

In the related art, under the uplink grant-free scheduling, a base station may pre-configure some scheduling information employed in uplink transmission for a terminal, such as resource allocation, transmission mode, and modulation and demodulation mode. When the terminal wakes up, it does not need to perform random access and receive uplink scheduling permission. In other words, uplink transmission may be automatically performed on a pre-configured resource, thereby reducing signaling overhead and avoiding power waste.

SUMMARY

According to a first aspect of embodiments of the disclosure, a method for transmitting data based on grant-free uplink scheduling is provided. The method is performed by a terminal. The method includes the following.

Listening, based on a first listening parameter, an acknowledgement on uplink data from a base station, during a process of transmitting the uplink data based on a target number of repeat transmissions through a grant-free uplink scheduling mechanism, the acknowledgement being configured to indicate a successful reception of the uplink data.

Terminating transmitting the uplink data in response to that the acknowledgement is listened before a completion of transmitting the uplink data based on the target number of repeat transmissions.

According to a second aspect of embodiments of the disclosure, a method for transmitting data based on grant-free uplink scheduling is provided. The method is performed by a base station. The method includes the following.

Receiving uplink data transmitted based on a target number of repeat transmissions by a terminal through a grant-free uplink scheduling mechanism.

Transmitting an acknowledgement on the uplink data to the terminal in response to a successful reception of the uplink data.

According to a third aspect of embodiments of the disclosure, a device for transmitting data based on grant-free uplink scheduling, applicable to a terminal, is provided. The device includes a processor; and a memory for storing instructions executable by the processor. The processor is configured to: listen, based on a first listening parameter, an acknowledgement on uplink data from a base station, during a process of transmitting the uplink data based on a target number of repeat transmissions through a grant-free uplink scheduling mechanism, the acknowledgement being configured to indicate a successful reception of the uplink data; and terminate transmitting the uplink data in response to that the acknowledgement is listened before a completion of transmitting the uplink data based on the target number of repeat transmissions.

According to a fourth aspect of embodiments of the disclosure, a device for transmitting data based on grant-free uplink scheduling, applicable to a base station, is provided. The device includes a processor; and a memory for storing instructions executable by the processor. The processor is configured to: receive uplink data transmitted based on a target number of repeat transmissions by a terminal through a grant-free uplink scheduling mechanism; and transmit an acknowledgement on the uplink data to the terminal in response to a successful reception of the uplink data.

According to a fifth aspect of embodiments of the disclosure, a computer-readable storage medium is provided. The computer-readable storage medium includes executable instructions that are called by a processor of a terminal, to perform a method for transmitting data based on grant-free uplink scheduling as claimed in the first aspect.

According to a sixth aspect of embodiments of the disclosure, a computer-readable storage medium is provided. The computer-readable storage medium includes executable instructions that are called by a processor of a base station, to perform a method for transmitting data based on grant-free uplink scheduling as claimed in the second aspect.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Figure 1:
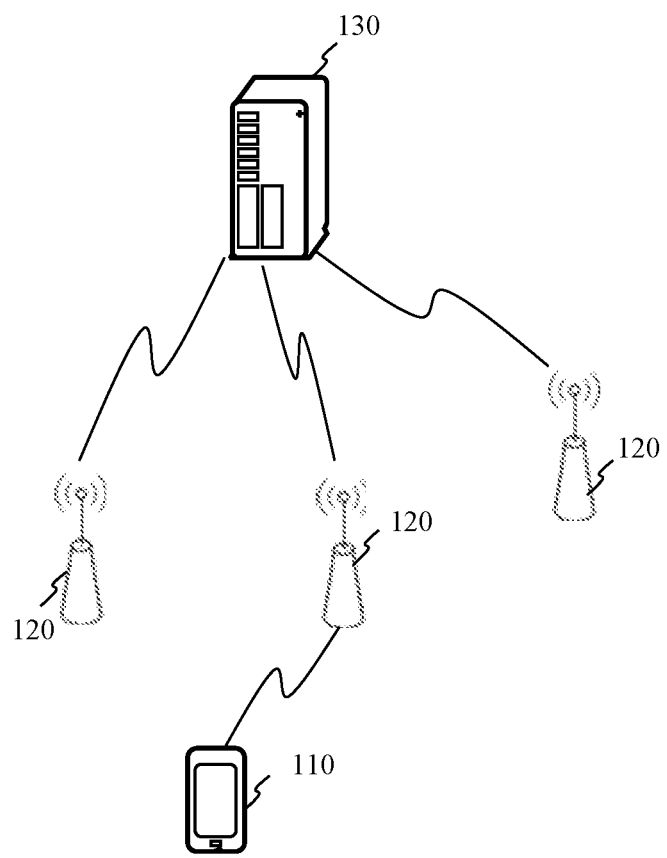
FIG. 1 is a schematic diagram of a wireless communication system, according to some embodiments.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

It should be understood that "several" mentioned in the disclosure may refer to one or more, and "plurality" or "multiple" may refer to two or more. The term "and/or" may describe association relationships of associated objects, indicating that there may be three types of relationships, for example, A and/or B, which may mean: A exists alone, A and B exist at the same time, and B exists alone. The character "/" generally indicates that the associated objects before and after are in an "or" relationship.

In recent years, with the vigorous development of Internet of Things (IoT) technologies, IoT devices have brought a lot of convenience to people's lives and work. Machine-type communication (MTC) and narrow band Internet of Things (NB-IoT) are typical representatives of cellular IoT technologies. At present, such technologies have been widely used in smart cities (such as reading meter), smart agriculture (for example collecting information such as temperature and humidity), smart transportation (such as shared bicycles), and many other fields.

Since most of terminals in MTC and NB-IoT are deployed in areas where wireless signal propagation is limited such as basements, and hardware capabilities of terminals are limited, their coverage capabilities are not as good as conventional Long Term Evolution (LTE) networks. Therefore, repeat transmission is usually used in MTC and NB-IoT networks to accumulate power, thereby achieving an effect of coverage enhancement. Simply, the repeat transmission means that the same transmission content is transmitted in multiple time units. This time unit may be one subframe or multiple subframes.

In addition, since most of terminals in MTC and NB-IoT are deployed in scenarios that are not easy to charge or replace batteries, such as in the open country or in the basement, the power saving for terminals in MTC and NB-IoT is a major feature of MTC and NB-IoT.

In the scenario of IoT, the amount of data transmitted each time is relatively small. If the conventional LTE data transmission process is followed, that is, when every time the data is transmitted, random access with the base station is performed, uplink scheduling permission is received, and data upload process is performed, it may bring huge signaling overhead, and resources occupied by signaling transmission may be far greater than resources occupied by data transmission. Therefore, for this scenario, uplink grant-free scheduling may be introduced into MTC and NB-IoT scenarios in the related art. That is, the base station may pre-configure some scheduling information used by the terminal for uplink transmission, such as resource allocation, modulation and coding mode, multi-antenna transmission mode, and transmission power. After the terminal wakes up, it does not need to perform random access and receive uplink scheduling permission, that is, it may automatically perform uplink transmission on a pre-configured resource in a preset mode, thereby achieving the purpose of reducing signaling overhead and avoiding power waste.

As mentioned above, in the uplink grant-free scheduling in the related art, the base station may pre-configure transmission resources and transmission modes for the terminal in advance (for example, the transmission modes may include modulation and coding modes, multi-antenna transmission modes, and transmission powers). When there is data to be transmitted for the user, it may be transmitted directly on the pre-configured resource based on the preset transmission mode.

In the uplink grant-free scheduling in the related art, considering that most IoT users' services are reported periodically, such as an electricity meter and a water meter report service data at regular intervals, so that the resource configured in the uplink grant-free scheduling is periodical. For example, the base station may configure a time-frequency location of the reserved resource, a size of the resource, a period in which the resource occurs, a format of user data transmission, such as the modulation and coding mode, and the like. When the user needs coverage enhancement, the base station may also configure the number of repeat transmissions.

In the related art, after the base station configures, for the terminal, the number of repeat transmissions of uplink data in advance, the terminal performs repeat transmission on the uplink data based on the number of repeat transmissions pre-configured by the base station during the uplink transmission process through the grant-free uplink scheduling. For example, the number of repeat transmissions pre-configured by the base station is 5. When the terminal wakes up and performs uplink transmission, based on the grant-free uplink scheduling mechanism, the uplink data that needs to be uploaded is repeatedly transmitted 5 times.

Since the channel condition of the terminal may vary, and the channel condition (the channel condition may be reported by the terminal) may not be accurate when the base station configures the number of repeat transmissions of uplink data for the terminal, there may be a case that too many repeat transmission times are configured by the base station for the user. However, in the related art, the terminal may transmit based on the number of repeat transmissions configured by the base station, resulting in too many repeat transmission times and the waste of the channel resource and terminal power.

In the uplink grant-free scheduling, a data transmission solution that not only satisfies the communication requirements of the terminal but also saves the channel resource and terminal power may be provided in the solutions provided in embodiments of the disclosure.

A data transmission solution based on uplink grant-free scheduling, provided in embodiments of the disclosure, may be applicable to a wireless communication system, such that a terminal transmitting uplink data to a base station may be implemented.

FIG. 1 is a schematic diagram illustrating a wireless communication system, according to some embodiments. As illustrated in FIG. 1, the mobile communication system may include: several terminals 110 and several base stations 120.

The terminal 110 may be a device that provides speech and/or data connectivity for the user. The terminal 110 may communicate with one or more core networks via a radio access network (RAN). The terminal 110 may be an IoT terminal, such as a sensor device, a mobile phone (or a "cellular" phone), and a computer having an Internet of Things terminal, for example, a fixed, portable, pocket-sized, handheld, computer built-in, or vehicle-mounted device. For example, it may be a station (STA), a subscriber unit, a subscriber station, a mobile station, a mobile, a remote station, an access point, a remote terminal, an access terminal, a user terminal, a user agent, a user device, or a user equipment (UE). Alternatively, the terminal 110 may also be a device of an unmanned aerial vehicle.

The base station 120 may be a network side device in the wireless communication system. The wireless communication system may be the 4th generation mobile communication (4G) system, also known as the Long Term Evolution (LTE) system; or, the wireless communication system may be the 5th generation mobile communication (5G) system, also known as the new radio (NR) system. Alternatively, the wireless communication system may be the next generation system following the 5G system.

The base station 120 may be an evolved node base station (eNB) used in the 4G system. Alternatively, the base station 120 may also be a generation node base station (gNB) adopting a centralized and distributed architecture in the 5G system. When the base station 120 adopts the centralized and distributed architecture, it usually includes a central unit (CU) and at least two distributed units (DUs). The central unit is provided with a protocol stack of a Packet Data Convergence Protocol (PDCP) layer, a Radio Link Control (RLC) layer, and a Media Access Control (MAC) layer. The distributed unit is provided with a protocol stack of a Physical (PHY) layer. Embodiments of the disclosure may not limit the implementation manner of the base station 120.

A wireless connection may be established between the base station 120 and the terminal 110 through a wireless air interface. In different embodiments, the wireless air interface may be a wireless air interface based on the 4G standard; or, the wireless air interface may be a wireless air interface based on the 5G standard, such as the wireless air interface is a new air interface; or the wireless air interface may be a wireless air interface based on the next generation mobile communication network technology standard following the 5G standard.

Optionally, the wireless communication system may further include a network management device 130.

Several base stations 120 are connected to the network management device 130 respectively. The network management device 130 may be a core network device in the wireless communication system. For example, the network management device 130 may be a Mobility Management Entity (MME) in an Evolved Packet Core (EPC). Alternatively, the network management device may be other core network devices, such as a Serving Gateway (SGW), a Public Data Network Gateway (PGW), a Policy and Charging Rules Function, or a Home Subscriber Server (HSS), etc. The implementation form of the network management device 130 is not limited in the embodiments of the disclosure.

In the disclosure, when the terminal transmits data to the base station, the uplink data may be repeatedly transmitted based on the uplink grant-free scheduling. In this process, the terminal may decide whether to terminate the uplink transmission according to the success of the uplink data transmission.

Figure 2:
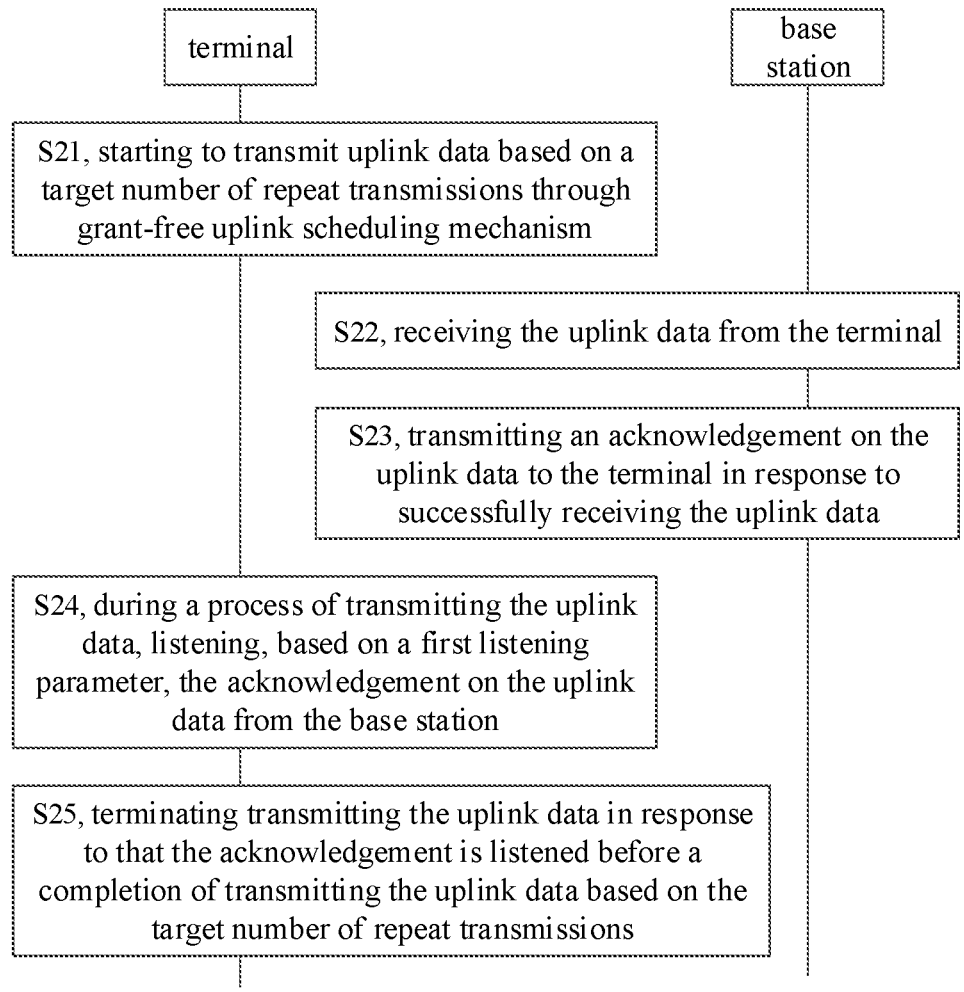
FIG. 2 is a flow chart illustrating a method for transmitting data based on grant-free uplink scheduling, according to an embodiment.

For example, referring to FIG. 2, which is a flow chart illustrating a method for transmitting data based on grant-free uplink scheduling, according to an embodiment. As illustrated in FIG. 2, the process of transmitting, by the terminal, uplink data to the base station includes the following.

In 21, the terminal starts to transmit uplink data based on a target number of repeat transmissions through the grant-free uplink scheduling mechanism.

The target number of repeat transmissions may be configured by the base station in advance for the terminal and used when uplink transmission is performed through the grant-free uplink scheduling mechanism.

For example, after the terminal wakes up at a certain time and finds that there are uplink data that needs to be uploaded to the base station in the local, it may start the repeat transmissions of the uplink data on the resource pre-configured by the base station through the grant-free uplink scheduling mechanism.

In 22, the base station receives the uplink data from the terminal.

The base station detects the uplink data from the terminal on the resource configured for the terminal by the base station to upload data through the grant-free uplink scheduling mechanism.

In 23, the base station transmits an acknowledgement on the uplink data to the terminal in response to successfully receiving the uplink data.

In the embodiments of the disclosure, after successfully detecting and receiving the uplink data from the terminal, the base station may return the acknowledgement on the uplink data to the terminal. For example, the acknowledgement may be an ACK (acknowledgement).

Optionally, when the base station fails to receive the uplink data from the terminal, it may also return to the terminal a failure on the uplink data, such as a NACK (negative acknowledgement).

In 24, during a process of transmitting the uplink data, the terminal listens, based on a first listening parameter, the acknowledgement on the uplink data from the base station.

In the embodiments of the disclosure, when the terminal is transmitting the uplink data and the number of times of transmitting the uplink data does not reach the target number of repeat transmissions, it may listen the base station's acknowledgement on the uplink data based on the first listening parameter.

In 25, transmitting the uplink data is terminated in response to that the acknowledgement is listened before a completion of transmitting the uplink data based on the target number of repeat transmissions.

In the embodiments of the disclosure, when the terminal successfully listens the acknowledgement on the uplink data from the base station, if the number of times that the uplink data is transmitted has not reached the target number of repeat transmissions, the terminal confirms that the uplink data has been successfully received by the base station. The transmission of the uplink data may be terminated.

That is, in the above solution, when the terminal repeatedly transmits certain uplink data through the grant-free uplink scheduling mechanism, the base station may transmit the acknowledgement to the terminal when the uplink data is successfully received. The terminal may listen the acknowledgement from the base station. The transmission of the uplink data may be terminated when the terminal receives the acknowledgement before the completion of transmitting the uplink data based on the target number of repeat transmissions. The unnecessary resource occupation and power consumption may be avoided. The channel resource and terminal power may be saved while transmission requirements of the uplink data may be satisfied.

Figure 3:
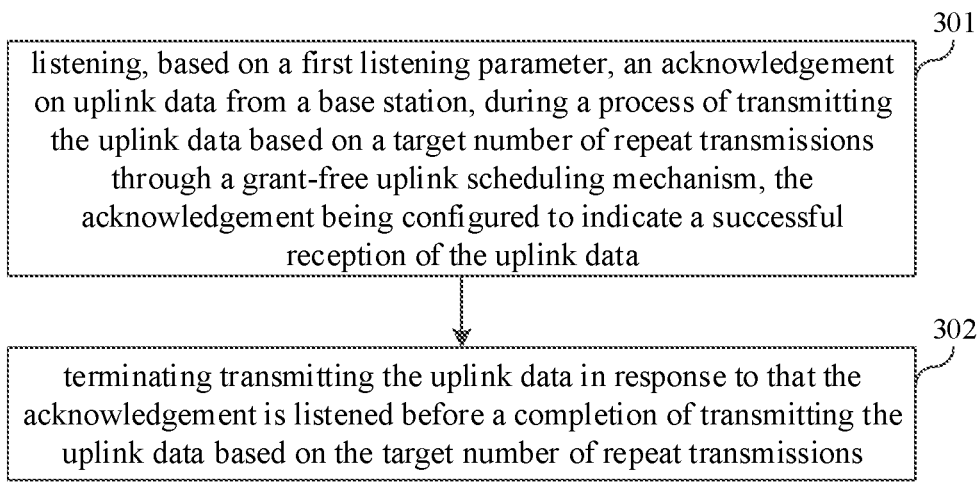
FIG. 3 is a flow chart illustrating a method for transmitting data based on grant-free uplink scheduling, according to an embodiment.

FIG. 3 is a flow chart illustrating a method for transmitting data based on grant-free uplink scheduling, according to an embodiment. As illustrated in FIG. 3, the method for transmitting data based on grant-free uplink scheduling is applied to the wireless communication system in FIG. 1 and performed by the terminal 110 in FIG. 1. The method may include the following.

In 301, it listens, based on a first listening parameter, an acknowledgement on uplink data from a base station during a process of transmitting the uplink data based on a target number of repeat transmissions through a grant-free uplink scheduling mechanism, the acknowledgement being configured to indicate a successful reception of the uplink data.

In 302, transmitting the uplink data is terminated in response to that the acknowledgement is listened before a completion of transmitting the uplink data based on the target number of repeat transmissions.

In a possible implementation, the first listening parameter includes at least one of: listening start time information and a number of repeat transmissions of the acknowledgement.

The listening start time information is configured to indicate time of starting to listen the acknowledgement.

In a possible implementation, the listening start time information is configured to indicate time of a completion of transmitting the uplink data for a $N^{th}$ time, $1 \leq N < M$, where M is a value of the target number of repeat transmissions.

N is a preset value or N is a value calculated based on M and a preset ratio.

In a possible implementation, listening, based on the first listening parameter, the acknowledgement on the uplink data from the base station, during the process of transmitting the uplink data based on the target number of repeat transmissions through the grant-free uplink scheduling mechanism includes: listening, based on the first listening parameter, a physical downlink control channel (PDCCH) from the base station, during the process of transmitting the uplink data based on the target number of repeat transmissions through the grant-free uplink scheduling mechanism.

In a possible implementation, the method further includes: receiving a parameter adjustment indication from the base station; and adjusting the first listening parameter to a second listening parameter based on the parameter adjustment indication.

In a possible implementation, the parameter adjustment indication includes the second listening parameter.

Or, the parameter adjustment indication includes a parameter offset between the first listening parameter and the second listening parameter.

In a possible implementation, the method further includes: obtaining an adjustment strategy of a transmission parameter for transmitting the uplink data in response to a change of the transmission parameter, the transmission parameter being a parameter used by the terminal for transmitting the uplink data; obtaining an adjustment strategy of the first listening parameter based on the adjustment strategy of the transmission parameter; and adjusting the first listening parameter to a third listening parameter based on the adjustment strategy of the first listening parameter.

In a possible implementation, the first listening parameter includes a number of repeat transmissions of the acknowledgement; the adjustment strategy of the transmission parameter includes a ratio of the target number of repeat transmissions before adjustment and the target number of repeat transmissions after adjustment.

Obtaining the adjustment strategy of the first listening parameter based on the adjustment strategy of the transmission parameter, includes: obtaining an adjustment ratio of the number of repeat transmissions of the acknowledgement based on the ratio of the target number of repeat transmissions before adjustment and the target number of repeat transmissions after adjustment.

Adjusting the first listening parameter to the third listening parameter based on the adjustment strategy of the first listening parameter includes: adjusting the number of repeat transmissions of the acknowledgement included in the first listening parameter based on the adjustment ratio of the number of repeat transmissions of the acknowledgement to obtain the third listening parameter.

In a possible implementation, the method further includes: enabling a function of terminating transmitting the uplink data before the completion of transmitting the uplink data based on the target number of repeat transmissions, in response to detecting a first trigger condition; and disabling the function of terminating transmitting the uplink data before the completion of transmitting the uplink data based on the target number of repeat transmissions, in response to detecting a second trigger condition.

In a possible implementation, the first trigger condition includes at least one of: receiving an enabling indication from the base station; and a corresponding acknowledgement being listening before the completion of transmitting the uplink data based on the target number of repeat transmissions during a process of transmitting n consecutive pieces of uplink data, where n is an integer greater than or equal to 1.

In a possible implementation, the second trigger condition includes at least one of: receiving a disabling indication from the base station; and a corresponding acknowledgement being not listening before the completion of transmitting the uplink data based on the target number of repeat transmissions during a process of transmitting m consecutive pieces of uplink data, where m is an integer greater than or equal to 1.

In summary, in the solution in the embodiments of the disclosure, when the terminal repeatedly transmits certain uplink data through the grant-free uplink scheduling mechanism, the base station may transmit the acknowledgement to the terminal when the uplink data is successfully received. The terminal may listen the acknowledgement from the base station. The transmission of the uplink data may be terminated when the terminal receives the acknowledgement before the completion of transmitting the uplink data based on the target number of repeat transmissions. The unnecessary resource occupation and power consumption may be avoided. The channel resource and terminal power may be saved while transmission requirements of the uplink data may be satisfied.

Figure 4:
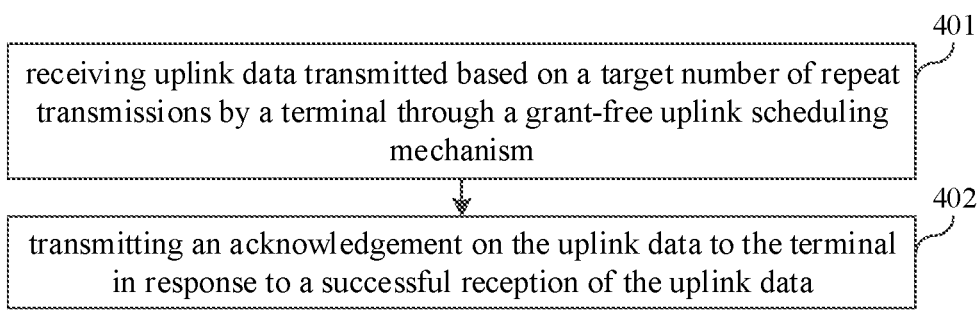
FIG. 4 is a flow chart illustrating a method for transmitting data based on grant-free uplink scheduling, according to an embodiment.

FIG. 4 is a flow chart illustrating a method for transmitting data based on grant-free uplink scheduling, according to an embodiment. As illustrated in FIG. 4, the method for transmitting data based on grant-free uplink scheduling is applied to the wireless communication system in FIG. 1 and performed by the base station 120 in FIG. 1. The method may include the following.

In 401, uplink data transmitted based on a target number of repeat transmissions by a terminal through a grant-free uplink scheduling mechanism, is received.

In 402, an acknowledgement on the uplink data is transmitted to the terminal in response to a successful reception of the uplink data.

In a possible implementation, transmitting the acknowledgement on the uplink data to the terminal in response to the successful reception of the uplink data, includes carrying the acknowledgement through a PDCCH in response to the successful reception of the uplink data.

In a possible implementation, the method further includes transmitting a parameter adjustment indication to the terminal, in which the parameter adjustment indication is configured to indicate the terminal to adjust a first listening parameter for listening the acknowledgement to a second listening parameter.

In a possible implementation, the parameter adjustment indication includes the second listening parameter.

Or, the parameter adjustment indication includes a parameter offset between the first listening parameter and the second listening parameter.

In a possible implementation, the method further includes transmitting an enabling indication to the terminal, in which the enabling indication is configured to indicate the terminal to enable a function of terminating transmitting the uplink data before the completion of transmitting the uplink data based on the target number of repeat transmissions.

In a possible implementation, the method further includes transmitting a disabling indication to the terminal, in which the disabling indication is configured to indicate the terminal to disable a function of terminating transmitting the uplink data before the completion of transmitting the uplink data based on the target number of repeat transmissions.

In summary, in the solution in the embodiments of the disclosure, when the terminal repeatedly transmits certain uplink data through the grant-free uplink scheduling mechanism, the base station may transmit the acknowledgement to the terminal when the uplink data is successfully received, so that the terminal may listen the acknowledgement from the base station. The transmission of the uplink data may be terminated when the terminal receives the acknowledgement before the completion of transmitting the uplink data based on the target number of repeat transmissions. The unnecessary resource occupation and power consumption may be avoided. The channel resource and terminal power may be saved while transmission requirements of the uplink data may be satisfied.

In any of the solutions in FIGS. 2 to 4, the listening parameter used when the terminal listens the acknowledgement on the uplink data from the base station may be pre-configured by the base station and may be updated. The manner of updating the listening parameter may include but is not limited to the following two.

1) updating based on an adjustment indication for the listening parameter from the base station.

2) link updating based on a related parameter used for transmitting the uplink data.

Subsequent method embodiments of the disclosure will take the above two manners of updating the listening parameter as examples for introduction and description respectively.

Figure 5:
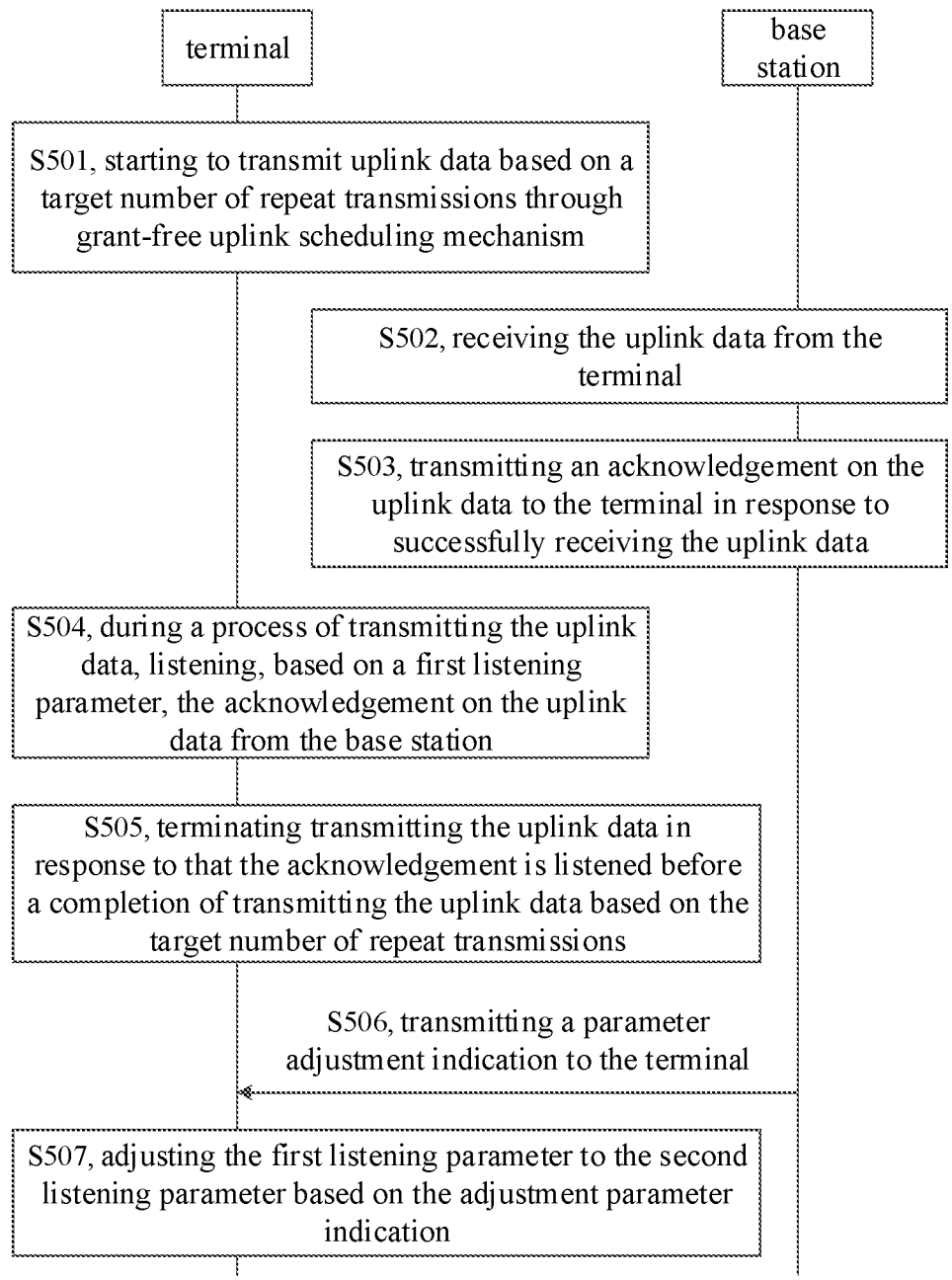
FIG. 5 is a flow chart illustrating a method for transmitting data based on grant-free uplink scheduling, according to an embodiment.

FIG. 5 is a flow chart illustrating a method for transmitting data based on grant-free uplink scheduling, according to an embodiment. As illustrated in FIG. 5, the method for transmitting data based on grant-free uplink scheduling is applied to the wireless communication system in FIG. 1. In the example, the terminal updates the first listening parameter based on the adjustment indication on the listening parameter from the base station. The method may include the following.

In 501, the terminal starts to transmit uplink data based on a target number of repeat transmissions through the grant-free uplink scheduling mechanism.

The target number of repeat transmissions may be configured by the base station in advance for the terminal and used when uplink transmission is performed through the grant-free uplink scheduling mechanism.

In the embodiments of the disclosure, the base station may pre-configure, for the terminal, a transmission parameter for transmitting the uplink data based on the grant-free uplink scheduling. The transmission parameter includes the target number of repeat transmissions.

Optionally, in addition to the target number of repeat transmissions, the transmission parameter may also include other parameters related to uplink transmission, such as an uplink transmission resource, a modulation and coding mode used for the uplink transmission, and a multi-antenna transmission mode.

Optionally, the transmission parameter may be configured by the base station to the terminal through a radio resource control (RRC) signaling when the terminal is in a RRC connected state.

For example, when the terminal is powered on and accesses the network for the first time, it establishes an RRC connection with the base station. The base station configures the transmission parameter to the terminal through the RRC connection, so that the terminal may, based on the uplink grant-free scheduling, perform the uplink transmission in the subsequent RRC idle state (i.e. IDLE state).

For example, the terminal enters sleep after obtaining the transmission parameter configured by the base station. When the terminal wakes up one subsequent time, it finds that there are uplink data that needs to be uploaded to the base station in the local storage, and the terminal is in the RRC idle state. At this time, the terminal may use the grant-free uplink scheduling mechanism to start the repeat transmissions of the uplink data based on the transmission parameter on the resource pre-configured by the base station.

In 502, the base station receives the uplink data from the terminal.

In the embodiments of the disclosure, after the base station configures the transmission parameter for the terminal, it may listen the uplink data from the terminal based on the transmission parameter. For example, the base station may listen and demodulate the uplink data from the terminal on the resource indicated by the transmission parameter based on the modulation and demodulation mode and the antenna transmission mode configured for the terminal.

In 503, the base station transmits an acknowledgement on the uplink data to the terminal in response to successfully receiving the uplink data.

In the embodiments of the disclosure, the base station may return an acknowledgment (such as ACK) on the uplink data to the terminal every time after successfully receiving the uplink data from the terminal. For example, if the terminal repeatedly transmits the uplink data for 5 times, and the base station successfully receives the uplink data for the second, third and fourth transmissions, the base station may also transmit the acknowledgment on the uplink data respectively for the second, third and fourth transmissions.

In a possible implementation, after successfully receiving the uplink data, the base station repeatedly transmits the acknowledgement to the terminal. For example, when the terminal transmits the uplink data for the second time, and the base station successfully receives the uplink data, the base station may repeatedly transmit the acknowledgement based on the number of repeat transmissions of the acknowledgement after the terminal transmits the uplink data for the second time. The acknowledgement is repeatedly transmitted 5 times, for example.

When the base station transmits the acknowledgement on the uplink data to the terminal, the acknowledgement may be carried through the PDCCH.

For example, in a possible implementation, the base station may carry the acknowledgement through downlink control information (DCI) in the PDCCH.

Optionally, when the base station fails to receive the uplink data from the terminal, it may also return a failure on the uplink data to the terminal, such as the NACK.

In 504, during a process of transmitting the uplink data, the terminal listens, based on a first listening parameter, the acknowledgement on the uplink data from the base station.

In the embodiments of the disclosure, when the terminal is transmitting the uplink data and the number of times of transmitting the uplink data does not reach the target number of repeat transmissions, it may listen the base station's acknowledgement on the uplink data based on the first listening parameter.

In a possible implementation, the first listening parameter includes at least one of: listening start time information and a number of repeat transmissions of the acknowledgement. The listening start time information is configured to indicate time of starting to listen the acknowledgement.

In the embodiments of the disclosure, it is possible to define the time for the terminal to start to listen the ACK on the uplink data from the base station (that is, the acknowledgement is returned).

Alternatively, the embodiments of the disclosure may define the number of repeat transmissions of the acknowledgement on the uplink data for the base station.

Alternatively, the embodiments of the disclosure may simultaneously define the time for the terminal to start to listen the ACK on the uplink data from the base station and the number of repeat transmissions of the acknowledgement on the uplink data for the base station.

In a possible implementation, the listening start time information is configured to indicate time of a completion of transmitting the uplink data for a $N^{th}$ time, $1 \leq N < M$, where M is a value of the target number of repeat transmissions; N is a preset value or N is a value calculated based on M and a preset ratio.

In the embodiments of the disclosure, the listening start time information may indicate N, which indicates that the terminal starts to listen the acknowledgement returned by the base station after transmitting the uplink data for the $N^{th}$ time.

In a possible implementation, the listening start time information may directly include N, that is, the time when the terminal starts to listen the acknowledgement from the base station may be an absolute time after the start of uplink data transmission. For example, it is supposed that N included in the listening start time information is 100, the terminal starts to listen the acknowledgement from the base station after the uplink data transmission is performed 100 times.

In another possible implementation, the listening start time information may indirectly indicate N. For example, N may be in a certain ratio to the target number of repeat transmissions, and the listening start time information may indicate the ratio. For example, it is supposed that the target number of repeat transmissions is 30, and the listening start time information contains a ratio of 2/3, the time for the terminal to start to listen the acknowledgement from the base station may be after a certain percentage of uplink transmission, that is, after uplink data is repeatedly transmitted 20 times.

In the embodiments of the disclosure, the first listening parameter may be pre-configured by the base station to the terminal. That is, the first listening parameter may be an initial listening parameter configured by the base station for the terminal.

For example, the base station may configure the first listening parameter for the terminal when configuring all or part of the transmission parameter for the terminal.

For example, the base station may configure the first listening parameter together when configuring a transmission resource used for the grant-free uplink scheduling for the terminal.

Alternatively, the first listening parameter may also be a configuration parameter obtained by updating on the basis of the initial listening parameter pre-configured by the base station.

In a possible implementation, it may listen, based on the first listening parameter, a PDCCH from the base station, when listening based on the first listening parameter the acknowledgement on the uplink data from the base station during the process of transmitting the uplink data based on the target number of repeat transmissions through the grant-free uplink scheduling mechanism.

For example, when the base station carries the acknowledgement through the DCI, the terminal may listen the PDCCH of the base station based on the first listening parameter, and obtain the acknowledgement from the PDCCH that is successfully listened.

In 505, transmitting the uplink data is terminated in response to that the acknowledgement is listened before a completion of transmitting the uplink data based on the target number of repeat transmissions.

In some embodiments of the disclosure, if the terminal receives the acknowledgement returned by the base station before completing the transmission of the target number of repeat transmissions on the uplink data, it is considered that the uplink data has been successfully transmitted in the uplink. The subsequent transmission of the uplink data is an unnecessary transmission action. At this time, the terminal may terminate the subsequent transmission of the uplink data.

For example, assuming that the target number of repeat transmissions is 10, the acknowledgement returned by the base station is successfully listened by the terminal when transmitting the uplink data for the $8^{th}$ time, and it is determined that the base station has received the uplink data. The terminal may terminate the uplink data transmission and no longer perform the last 2 transmissions.

The first listening parameter may be updated. For example, for the updating, reference should be made to subsequent 506 and step 507.

In 506, the base station transmits a parameter adjustment indication to the terminal, and accordingly, the terminal receives the parameter adjustment indication.

The parameter adjustment indication is configured to indicate the terminal to adjust the first listening parameter used for listening the acknowledgement to the second listening parameter.

In the embodiments of the disclosure, the base station may transmit the parameter adjustment indication to the terminal through the PDCCH, and accordingly, the terminal obtains the parameter adjustment indication by listening the PDCCH of the base station.

In a possible implementation, the ACK fed back by the base station is carried by the PDCCH. Correspondingly, the base station may also carry the parameter adjustment indication through the PDCCH carrying the ACK (that is, the acknowledgement).

For example, the base station may carry the parameter adjustment indication in the DCI carrying the ACK in the PDCCH, or the base station may also carry the parameter adjustment indication in the PDCCH carrying the ACK and outside the DCI.

When reconfiguring the relevant parameter for the terminal to listen the PDCCH (that is, the first listening parameter), the parameter that may be reconfigured may include at least one of: start time when the terminal starts to listen the ACK and the number of repeat transmissions of the PDCCH carrying the ACK.

In 507, the terminal adjusts the first listening parameter to the second listening parameter based on the adjustment parameter indication.

In a possible implementation, the parameter adjustment indication includes the second listening parameter; and the terminal may directly adjust the first listening parameter to the second listening parameter included in the parameter adjustment indication.

Alternatively, the parameter adjustment indication includes a parameter offset between the first listening parameter and the second listening parameter. The terminal may modify the first listening parameter based on the parameter offset between the first listening parameter and the second listening parameter to obtain the second listening parameter. In the subsequent process of transmitting new uplink data, the terminal may listen the acknowledgement on the new uplink data from the base station based on the second listening parameter.

For example, in the embodiments of the disclosure, the terminal may adjust the listening parameter based on the indication of the base station in the following two ways.

1) The high-level layer defines a set of candidate parameters, and the base station indicates one parameter/a group of parameters in the set of candidate parameters through the PDCCH. When subsequently transmitting the ACK (that is, returning the acknowledgement on the uplink data transmitted by the terminal), transmitting is performed based on the indicated parameter. Correspondingly, the terminal also performs related listening based on the indicated parameter.

For example, the base station may pre-define a set of candidate parameters through the high-level signaling. The set of candidate parameters contains multiple groups of available parameters. When the base station transmits the adjustment parameter indication, the adjustment parameter indication may be carried in the PDCCH carrying the acknowledgement (i.e. ACK). The adjustment parameter indication is configured to indicate a group of parameters in the set of candidate parameters. For example, the adjustment parameter indication contains the serial numbers of the group of adjusted listening parameters (corresponding to the second listening parameter). When the terminal is listening the acknowledgement, the adjustment parameter indication is obtained from the PDCCH that is successfully listened. In the subsequent process of transmitting new uplink data, it may listen the PDCCH from the base station through the group of listening parameters corresponding to the serial numbers in the adjustment parameter indication.

2) The high-level layer defines a set of parameter offsets, and the base station indicates one parameter offset/a group of parameter offsets in the set of parameter offsets through the PDCCH. The base station determines a new transmission parameter based on the originally configured parameter (corresponding to the first listening parameter) and the indicated parameter offset. When the ACK on the corresponding uplink data transmitted by the terminal is subsequently transmitted, the transmission is performed based on the determined transmission parameter. Correspondingly, the terminal also determines a new listening parameter based on the originally configured parameter (corresponding to the first listening parameter) and the indicated parameter offset, and listens the related PDCCH.

For example, in the original configuration of the base station, the number of repeat transmissions of the PDCCH used to carry the acknowledgement is 100. The parameter offset of the number of repeat transmissions defined by the high-level layer include (+10, +20, −10, −20), and the base station indicates that the parameter offset is −10 through the PDCCH. The base station and the terminal respectively determine that the number of repeat transmissions of the PDCCH used by the base station to transmit the acknowledgement is 100−10=90 times.

In another example, in the original configuration of the base station, the listening start time information that the terminal starts to listen the PDCCH carrying the acknowledgement may include that N is 20 (that is, the terminal starts to listen the PDCCH from the base station which carries the acknowledgement after repeating the transmission of the uplink data 20 times). The parameter offset of N, defined by the high-level layer, includes (+5, +10, −5, −10). The parameter offset indicated by the base station through the PDCCH is −5. The new N determined by the terminal is 20−5=15, that is, the terminal starts to listen the acknowledgement carried in the PDCCH from the base station after repeating transmission of new uplink data 15 times subsequently.

In the embodiments of the disclosure, the base station may also enable or disable the function of terminating transmitting the uplink data in advance. For example, in a possible implementation, when the terminal detects the first trigger condition, the terminal enables the function of terminating transmitting the uplink data before the completion of transmitting the uplink data based on the target number of repeat transmissions; and/or when the terminal detects the second trigger condition, the terminal disables the function of terminating transmitting the uplink data before the completion of transmitting the uplink data based on the target number of repeat transmissions.

In a possible implementation, the first trigger condition includes at least one of: receiving an enabling indication from the base station; and a corresponding acknowledgement being listening before the completion of transmitting the uplink data based on the target number of repeat transmissions during a process of transmitting n consecutive pieces of uplink data, where n is an integer greater than or equal to 1.

For example, in the case that the terminal has disabled the function of terminating transmitting the uplink data in advance, the base station may transmit an enabling indication to the terminal. The enabling indication is configured to indicate the terminal to enable the function of terminating transmitting the uplink data before the completion of transmitting the uplink data based on the target number of repeat transmissions.

The enabling indication may be transmitted by the base station to the terminal through the PDCCH. For example, the base station may carry the enabling indication through the DCI carrying the acknowledgement in the PDCCH.

Or, in the case that the terminal has disabled the function of terminating transmitting the uplink data in advance, the terminal may perform statistics on the number of consecutive uplink data that the corresponding acknowledgements are successfully listened before completing the uplink transmission of the target number of repeat transmissions. When the number obtained by the terminal statistics is greater than n, the function of terminating transmitting the uplink data in advance may be enabled. During the subsequent transmission of new uplink data, if the acknowledgement on the uplink data is listened before the uplink transmission of the target number of repeat transmissions is completed, transmitting the uplink data is terminated.

For example, it is assumed that the terminal has disabled the function of terminating the uplink data in advance. In this case, when the terminal transmits certain uplink data, even before completing the uplink transmission of the target number of repeat transmissions, it successfully listens the acknowledgement on the corresponding uplink data and may not terminate terminating the uplink data. It is assumed that the target number of repeat transmissions is 100. If the terminal receives all acknowledgements from the base station on the continuous transmission of 5 different uplink data before performing 100 repeat transmissions on each uplink data, the terminal may enable the function of terminating the uplink data in advance. In the subsequent transmission of the sixth uplink data, if the acknowledgement returned by the base station is received before 100 repeat transmissions are performed, the terminal may terminate transmitting the sixth uplink data.

In a possible implementation, the second trigger condition includes at least one of: receiving a disabling indication from the base station; and a corresponding acknowledgement being not listening before the completion of transmitting the uplink data based on the target number of repeat transmissions during a process of transmitting m consecutive pieces of uplink data, where m is an integer greater than or equal to 1.

For example, in the case that the terminal has enabled the function of terminating transmitting the uplink data in advance, the base station may transmit a disabling indication to the terminal. The disabling indication is configured to indicate the terminal to disable the function of terminating transmitting the uplink data before the completion of transmitting the uplink data based on the target number of repeat transmissions.

The disabling indication may be transmitted by the base station to the terminal through the PDCCH. For example, the base station may carry the disabling indication through the DCI carrying the acknowledgement in the PDCCH.

Or, in the case that the terminal has disabled the function of terminating transmitting the uplink data in advance, the terminal may perform statistics on the number of consecutive uplink data that the corresponding acknowledgements are not successfully listened before completing the uplink transmission of the target number of repeat transmissions. When the number obtained by the terminal statistics is greater than m, the function of terminating transmitting the uplink data in advance may be disabled. During the subsequent transmission of new uplink data, if the acknowledgement on the uplink data is listened before the uplink transmission of the target number of repeat transmissions is completed, transmitting the uplink data is not terminated.

For example, it is assumed that the terminal has enabled the function of terminating the uplink data in advance. In this case, when the terminal transmits certain uplink data, before completing the uplink transmission of the target number of repeat transmissions, it successfully listens the acknowledgement on the corresponding uplink data and may terminate terminating the uplink data. It is assumed that the target number of repeat transmissions is 100. If the terminal does not receive all acknowledgements from the base station on the continuous transmission of 5 different uplink data before performing 100 repeat transmissions on each uplink data, the terminal may disable the function of terminating the uplink data in advance. In the subsequent transmission of the sixth uplink data, if the acknowledgement returned by the base station is received before 100 repeat transmissions are performed, the terminal may not terminate transmitting the sixth uplink data.

In summary, in the solution in the embodiments of the disclosure, when the terminal repeatedly transmits certain uplink data through the grant-free uplink scheduling mechanism, the base station may transmit the acknowledgement to the terminal when the uplink data is successfully received, so that the terminal may listen the acknowledgement from the base station. The transmission of the uplink data may be terminated when the terminal receives the acknowledgement before the completion of transmitting the uplink data based on the target number of repeat transmissions. The unnecessary resource occupation and power consumption may be avoided. The channel resource and terminal power may be saved while transmission requirements of the uplink data may be satisfied.

Figure 6:
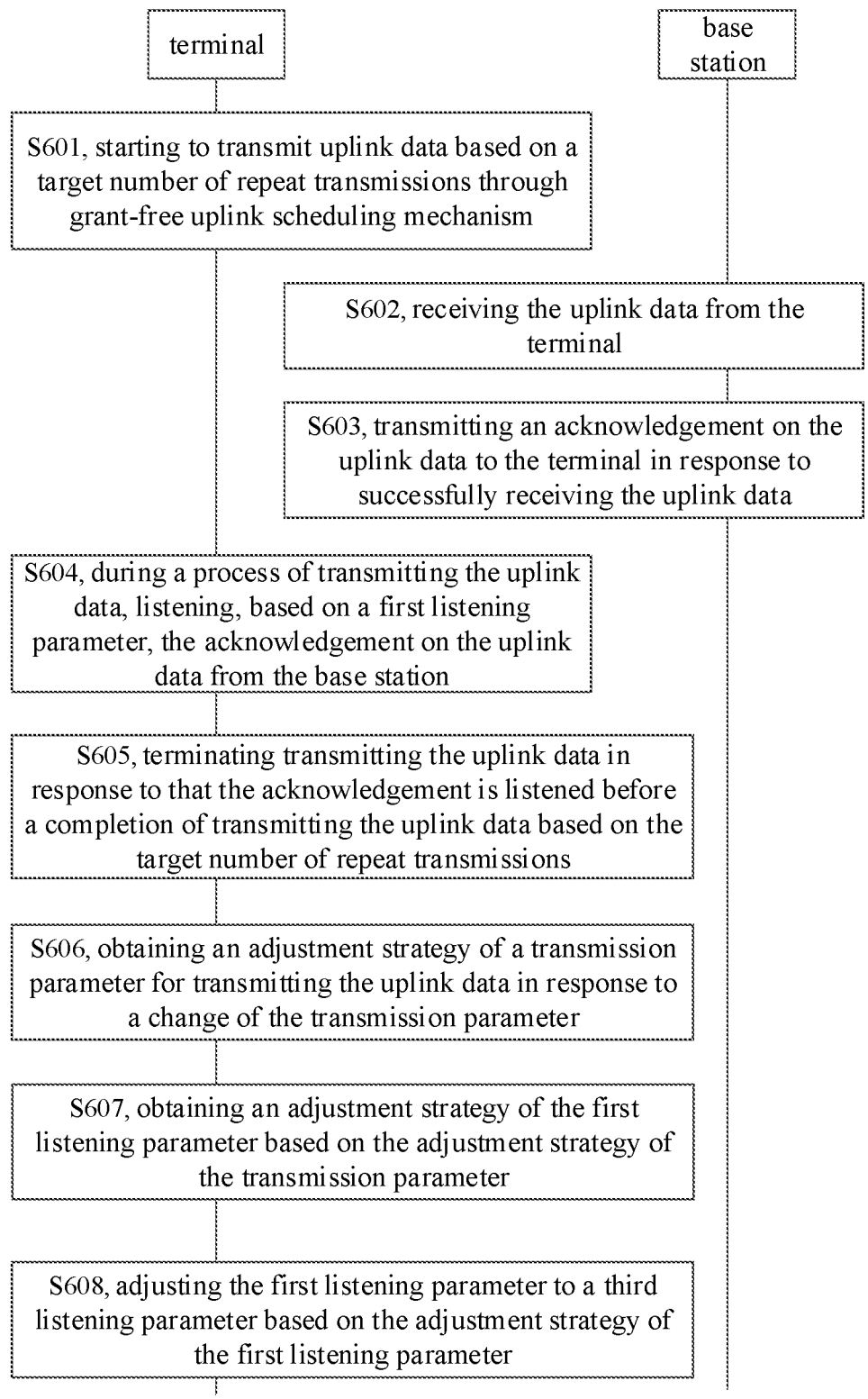
FIG. 6 is a flow chart illustrating a method for transmitting data based on grant-free uplink scheduling, according to an embodiment.

FIG. 6 is a flow chart illustrating a method for transmitting data based on grant-free uplink scheduling, according to an embodiment. As illustrated in FIG. 6, the method for transmitting data based on grant-free uplink scheduling is applied to the wireless communication system in FIG. 1. In the example, the terminal updates the listening parameter through the link based on the related parameter used for transmitting the uplink data. The method may include the following.

In 601, the terminal starts to transmit uplink data based on a target number of repeat transmissions through the grant-free uplink scheduling mechanism.

In 602, the base station receives the uplink data from the terminal.

In 603, the base station transmits an acknowledgement on the uplink data to the terminal in response to successfully receiving the uplink data.

In 604, during a process of transmitting the uplink data, the terminal listens, based on a first listening parameter, the acknowledgement on the uplink data from the base station.

In 605, transmitting the uplink data is terminated in response to that the acknowledgement is listened before a completion of transmitting the uplink data based on the target number of repeat transmissions.

For the execution process of 601 to 605, reference may be made to the description under 501 to 505 in the embodiments in FIG. 5, which will not be repeated herein.

In 606, the terminal obtains an adjustment strategy of a transmission parameter for transmitting the uplink data in response to a change of the transmission parameter, the transmission parameter being a parameter used by the terminal for transmitting the uplink data.

For the description about the transmission parameter, reference may be made to the description of the transmission parameter in the embodiments in FIG. 5, which will not be repeated herein.

In 607, an adjustment strategy of the first listening parameter is obtained based on the adjustment strategy of the transmission parameter.

In 608, the first listening parameter is adjusted to a third listening parameter based on the adjustment strategy of the first listening parameter.

In the subsequent process of transmitting new uplink data, the terminal may listen the acknowledgement on the new uplink data from the base station based on the third listening parameter.

In a possible implementation, the first listening parameter includes a number of repeat transmissions of the acknowledgement; the adjustment strategy of the transmission parameter includes a ratio of the target number of repeat transmissions before adjustment and the target number of repeat transmissions after adjustment.

When obtaining the adjustment strategy of the first listening parameter based on the adjustment strategy of the transmission parameter, the terminal obtains an adjustment ratio of the number of repeat transmissions of the acknowledgement based on the ratio of the target number of repeat transmissions before adjustment and the target number of repeat transmissions after adjustment.

When adjusting the first listening parameter to the third listening parameter based on the adjustment strategy of the first listening parameter, the terminal adjusts the number of repeat transmissions of the acknowledgement included in the first listening parameter based on the adjustment ratio of the number of repeat transmissions of the acknowledgement to obtain the third listening parameter.

In the embodiments of the disclosure, the first listening parameter may be linked with the related configuration of data transmission. For example, it may be linked with the number of data repeat transmissions or the transmission power. For example, the number of repeat transmissions of the PDCCH carrying the ACK by the base station may be scaled in proportion to the target number of repeat transmissions of the uplink data by the base station.

For example, it is assumed that the number of repeat transmissions of the PDCCH carrying the ACK by the base station is 30. During a certain data transmission, the base station updates the target number of repeat transmissions for the terminal's subsequent uplink data transmission, for example, updates from 100 to 50. Then when the terminal updates the target number of repeat transmissions from 100 to 50, the base station and the terminal also update the number of repeat transmissions of the PDCCH carrying the ACK from 30 to 15. That is, after the base station subsequently receives the new uplink data from the terminal, the base station transmits the PDCCH carrying the ACK based on the number of repeat transmissions of 15 times. Accordingly, the terminal listens the PDCCH from the base station based on the number of repeat transmissions of 15 times.

In some embodiments of the disclosure, the base station may also enable or disable the function of terminating transmitting the uplink data in advance. For this process, reference may be made to the description of enabling/disabling the function of terminating transmitting the uplink data in advance in the embodiments in FIG. 5, which will not be repeated herein.

In summary, in the solution in the embodiments of the disclosure, when the terminal repeatedly transmits certain uplink data through the grant-free uplink scheduling mechanism, the base station may transmit the acknowledgement to the terminal when the uplink data is successfully received, so that the terminal may listen the acknowledgement from the base station. The transmission of the uplink data may be terminated when the terminal receives the acknowledgement before the completion of transmitting the uplink data based on the target number of repeat transmissions. The unnecessary resource occupation and power consumption may be avoided. The channel resource and terminal power may be saved while transmission requirements of the uplink data may be satisfied.

The following are apparatus embodiments of the disclosure, which may be used to implement the method embodiments of the disclosure. For details that are not disclosed in the apparatus embodiments of the disclosure, reference may be made to the method embodiments of the disclosure.

Figure 7:
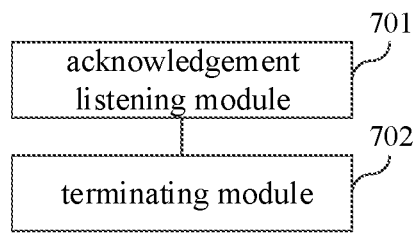
FIG. 7 is a block diagram illustrating an apparatus for transmitting data based on grant-free uplink scheduling, according to an embodiment.

FIG. 7 is a block diagram illustrating an apparatus for transmitting data based on grant-free uplink scheduling, according to an embodiment. As illustrated in FIG. 7, the apparatus for transmitting data based on grant-free uplink scheduling may be implemented by hardware or a combination of hardware and software. It is implemented as all or part of the terminal in the implementation environment in FIG. 1 to execute actions executed by the terminal in any of the embodiments in FIG. 2, FIG. 3, FIG. 5 or FIG. 6. The apparatus for transmitting data based on grant-free uplink scheduling includes an acknowledgement listening module 701 and a terminating module 702.

The acknowledgement listening module 701 is configured to listen, based on a first listening parameter, an acknowledgement on uplink data from a base station, during a process of transmitting the uplink data based on a target number of repeat transmissions through a grant-free uplink scheduling mechanism, the acknowledgement being configured to indicate a successful reception of the uplink data.

The terminating module 702 is configured to terminate transmitting the uplink data in response to that the acknowledgement is listened before a completion of transmitting the uplink data based on the target number of repeat transmissions.

Alternatively, the first listening parameter includes at least one of: listening start time information and a number of repeat transmissions of the acknowledgement.

The listening start time information is configured to indicate time of starting to listen the acknowledgement.

Alternatively, the listening start time information is configured to indicate time of a completion of transmitting the uplink data for a $N^{th}$ time, $1 \leq N < M$, where M is a value of the target number of repeat transmissions.

N is a preset value or N is a value calculated based on M and a preset ratio.

Alternatively, the acknowledgement listening module is configured to listen, based on the first listening parameter, a physical downlink control channel (PDCCH) from the base station, during the process of transmitting the uplink data based on the target number of repeat transmissions through the grant-free uplink scheduling mechanism.

Alternatively, the apparatus further includes an adjustment indication receiving module, configured to receive a parameter adjustment indication from the base station; and a first parameter adjustment module, configured to adjust the first listening parameter to a second listening parameter based on the parameter adjustment indication.

Alternatively, the parameter adjustment indication includes the second listening parameter.

Or, the parameter adjustment indication includes a parameter offset between the first listening parameter and the second listening parameter.

Alternatively, the apparatus further includes: a first adjustment strategy obtaining module, configured to obtain an adjustment strategy of a transmission parameter for transmitting the uplink data in response to a change of the transmission parameter, the transmission parameter being a parameter used by the terminal for transmitting the uplink data; a second adjustment strategy obtaining module, configured to obtain an adjustment strategy of the first listening parameter based on the adjustment strategy of the transmission parameter; and a second parameter adjustment module, configured to adjust the first listening parameter to a third listening parameter based on the adjustment strategy of the first listening parameter.

Alternatively, the first listening parameter includes a number of repeat transmissions of the acknowledgement; the adjustment strategy of the transmission parameter includes a ratio of the target number of repeat transmissions before adjustment and the target number of repeat transmissions after adjustment.

The second adjustment strategy obtaining module is configured to obtain an adjustment ratio of the number of repeat transmissions of the acknowledgement based on the ratio of the target number of repeat transmissions before adjustment and the target number of repeat transmissions after adjustment.

The second parameter adjustment module is configured to adjust the number of repeat transmissions of the acknowledgement included in the first listening parameter based on the adjustment ratio of the number of repeat transmissions of the acknowledgement to obtain the third listening parameter.

Alternatively, the apparatus further includes: an enabling module, configured to enable a function of terminating transmitting the uplink data before the completion of transmitting the uplink data based on the target number of repeat transmissions, in response to detecting a first trigger condition; and a disabling module, configured to disable the function of terminating transmitting the uplink data before the completion of transmitting the uplink data based on the target number of repeat transmissions, in response to detecting a second trigger condition.

Alternatively, the first trigger condition includes at least one of: receiving an enabling indication from the base station; and a corresponding acknowledgement being listening before the completion of transmitting the uplink data based on the target number of repeat transmissions during a process of transmitting n consecutive pieces of uplink data, where n is an integer greater than or equal to 1.

Alternatively, the second trigger condition includes at least one of: receiving a disabling indication from the base station; and a corresponding acknowledgement being not listening before the completion of transmitting the uplink data based on the target number of repeat transmissions during a process of transmitting m consecutive pieces of uplink data, where m is an integer greater than or equal to 1.

Figure 8:
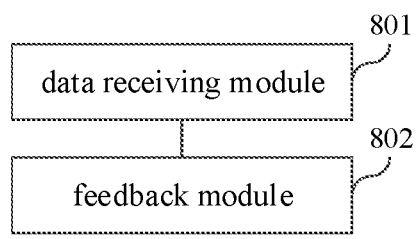
FIG. 8 is a block diagram illustrating an apparatus for transmitting data based on grant-free uplink scheduling, according to an embodiment.

FIG. 8 is a block diagram illustrating an apparatus for transmitting data based on grant-free uplink scheduling, according to an embodiment. As illustrated in FIG. 8, the apparatus for transmitting data based on grant-free uplink scheduling may be implemented by hardware or a combination of hardware and software. It is implemented as all or part of the base station in the implementation environment in FIG. 1 to execute actions executed by the base station in any of the embodiments in FIG. 2, FIG. 3, FIG. 5 or FIG. 6. The apparatus for transmitting data based on grant-free uplink scheduling includes a data receiving module 801 and a feedback module 802.

The data receiving module 801 is configured to receive uplink data transmitted based on a target number of repeat transmissions by a terminal through a grant-free uplink scheduling mechanism.

The feedback module 802 is configured to transmit an acknowledgement on the uplink data to the terminal in response to a successful reception of the uplink data.

Alternatively, the feedback module is configured to carry the acknowledgement through a physical downlink control channel (PDCCH) in response to the successful reception of the uplink data.

Alternatively, the apparatus further includes an adjustment indication transmitting module, configured to transmit a parameter adjustment indication to the terminal, in which the parameter adjustment indication is configured to indicate the terminal to adjust a first listening parameter for listening the acknowledgement to a second listening parameter.

Alternatively, the parameter adjustment indication includes the second listening parameter.

Or, the parameter adjustment indication includes a parameter offset between the first listening parameter and the second listening parameter.

Alternatively, the apparatus further includes an enabling indication transmitting module, configured to transmit an enabling indication to the terminal, in which the enabling indication is configured to indicate the terminal to enable a function of terminating transmitting the uplink data before the completion of transmitting the uplink data based on the target number of repeat transmissions.

Alternatively, the apparatus further includes a disabling indication transmitting module, configured to transmit a disabling indication to the terminal, in which the disabling indication is configured to indicate the terminal to disable a function of terminating transmitting the uplink data before the completion of transmitting the uplink data based on the target number of repeat transmissions.

Exemplary embodiments of the disclosure also provide a system for transmitting data based on grant-free uplink scheduling. The system includes a terminal and a base station.

The terminal includes the apparatus for transmitting data based on grant-free uplink scheduling, as described in the embodiments in FIG. 7.

The base station includes the apparatus for transmitting data based on grant-free uplink scheduling, as described in the embodiments in FIG. 8.

It should be noted that the apparatuses provided by the above embodiments may be illustrated exemplarily by the division of each of the respective function modules. In actual applications, the above functions may be allocated by different functional modules based on actual needs, so that the content structure of the apparatus may be divided into different functional modules to complete all or part of the above described.

With respect to the apparatuses in the above embodiments, the specific manners for performing operations for individual modules therein have been described in detail in the embodiments regarding the methods, which will not be elaborated herein.

Exemplary embodiments of the disclosure may further provide a device for transmitting data based on grant-free uplink scheduling, which may implement actions executable by the terminal in any of embodiments illustrated in FIG. 2, FIG. 3, FIG. 5 or FIG. 6. The device may include a processor; and a memory for storing instructions executable by the processor.

The processor is configured to: listen, based on a first listening parameter, an acknowledgement on uplink data from a base station, during a process of transmitting the uplink data based on a target number of repeat transmissions through a grant-free uplink scheduling mechanism, the acknowledgement being configured to indicate a successful reception of the uplink data; and terminate transmitting the uplink data in response to that the acknowledgement is listened before a completion of transmitting the uplink data based on the target number of repeat transmissions.

Exemplary embodiments of the disclosure may further provide a device for transmitting data based on grant-free uplink scheduling, which may implement actions executable by the base station in any of embodiments illustrated in FIG. 2, FIG. 3, FIG. 5 or FIG. 6. The device may include a processor; and a memory for storing instructions executable by the processor.

The processor is configured to: receive uplink data transmitted based on a target number of repeat transmissions by a terminal through a grant-free uplink scheduling mechanism; and transmit an acknowledgement on the uplink data to the terminal in response to a successful reception of the uplink data.

The above may employ the terminal and the base station as an example to describe the solutions provided in embodiments of the disclosure. It should be appreciated that the terminal and the base station include the hardware structure and/or the software module that performs each function. The disclosure may be implemented in hardware or in a combination of hardware and computer software in connection with modules and actions of the examples described in the embodiments of the disclosure. It depends on specific applications and design constraints of the technical solutions to employ the hardware or the combination of hardware and computer software to implement a certain function. Those skilled in the art may use different methods to implement the described functions for each particular application, but this implementation should not be considered to exceed the scope of the technical solutions of the disclosure.

Figure 9:
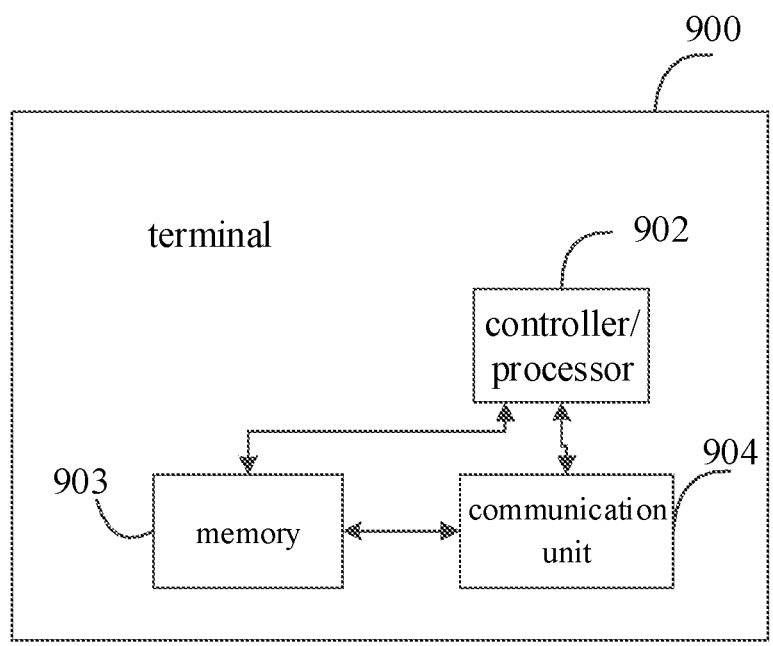
FIG. 9 is a block diagram illustrating a device for transmitting data based on grant-free uplink scheduling, according to an embodiment.

FIG. 9 is a block diagram illustrating a device for transmitting data based on grant-free uplink scheduling, according to an embodiment. The device 900 may be implemented as the terminal or the base station in various embodiments described above.

The device 900 may include a communication unit 904 and a processor 902. The processor 902 may also be a controller, and FIG. 9 is shown as "controller/processor 902". The communication unit 904 is configured to support terminals to communicate with other network devices (e.g., base stations, etc.).

Further, the device 900 may include a memory 903. The memory 903 is configured to store program codes and data of the terminal 900.

It should be appreciated that FIG. 9 shows only the simplified design of the device 900. In practical applications, the device 900 may include any number of processors, controllers, memory, communication units, and the like, and all terminals or base stations that may implement the are within the scope of the disclosure.

Those skilled in the art should appreciate that in the above or more examples, the functions described in the disclosure may be implemented with hardware, software, firmware, or any combination thereof. When implementing using software, these functions may be stored in a computer readable medium, or transmitted as one or more instructions or codes on a computer readable medium. The computer readable medium includes a computer storage medium and a communication medium. The communication medium includes any medium that facilitates transmitting a computer program from one place to another. The storage medium may be any available medium that may be accessed by a general or dedicated computer.

The disclosure also provides a computer storage medium for storing computer software instructions used in the above-described terminal or base station, which may include programs for performing the above-described method for transmitting data based on grant-free uplink scheduling.

Other embodiments of the disclosure will be apparent to those skilled in the art from consideration of the specification and practice of the disclosure disclosed here. This disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims

What is claimed is:

1. A method for transmitting data based on grant-free uplink scheduling, performed by a terminal, comprising:
   listening, based on a first listening parameter, for an acknowledgement in response to uplink data, the acknowledgement transmitted from a base station during a process of transmitting the uplink data based on a target number of repeat transmissions through a grant-free uplink scheduling mechanism, the acknowledgement being configured to indicate successful reception of the uplink data, wherein the first listening parameter comprises listening start time information configured to indicate time of starting to listen for the acknowledgement;
   terminating the transmission of the uplink data in response to the acknowledgement being received before completing the transmission of the uplink data based on the target number of repeat transmissions;
   receiving a parameter adjustment indication from the base station; and
   adjusting the first listening parameter to a second listening parameter based on the parameter adjustment indication.

2. The method as claimed in claim 1, wherein
   the listening start time information is configured to indicate time of completing the transmission of the uplink data for a $N^{th}$ time, $1 \leq N < M$, where M is a value of the target number of repeat transmissions;
   wherein N is a preset value or N is a value calculated based on M and a preset ratio.

3. The method as claimed in claim 1, wherein listening comprises:
   listening, based on the first listening parameter, a physical downlink control channel (PDCCH) from the base station, during the process of transmitting the uplink data based on the target number of repeat transmissions through the grant-free uplink scheduling mechanism.

4. The method as claimed in claim 1, wherein
   the parameter adjustment indication comprises the second listening parameter, or
   the parameter adjustment indication comprises a parameter offset between the first listening parameter and the second listening parameter.

5. The method as claimed in claim 1, further comprising:
   obtaining an adjustment strategy of a transmission parameter for transmitting the uplink data in response to a change of the transmission parameter, the transmission parameter being a parameter used by the terminal for transmitting the uplink data;

obtaining an adjustment strategy of the first listening parameter based on the adjustment strategy of the transmission parameter; and adjusting the first listening parameter to a third listening parameter based on the adjustment strategy of the first listening parameter.

6. The method as claimed in claim 5, wherein the first listening parameter comprises a number of repeat transmissions of the acknowledgement; and the adjustment strategy of the transmission parameter comprises a ratio of a target number of repeat transmissions before adjustment to a target number of repeat transmissions after adjustment;

wherein obtaining the adjustment strategy of the first listening parameter based on the adjustment strategy of the transmission parameter comprises:

obtaining an adjustment ratio of the number of repeat transmissions of the acknowledgement based on the ratio of the target number of repeat transmissions before adjustment to the target number of repeat transmissions after adjustment;

wherein adjusting the first listening parameter to the third listening parameter based on the adjustment strategy of the first listening parameter comprises:

adjusting the number of repeat transmissions of the acknowledgement comprised in the first listening parameter based on the adjustment ratio of the number of repeat transmissions of the acknowledgement to obtain the third listening parameter.

7. The method as claimed in claim 1, further comprising:

enabling a function of terminating the transmission of the uplink data before completing the transmission of the uplink data based on the target number of repeat transmissions, in response to detecting a first trigger condition; and disabling the function of terminating the transmission of the uplink data before completing the transmission of the uplink data based on the target number of repeat transmissions, in response to detecting a second trigger condition.

8. The method as claimed in claim 7, wherein the first trigger condition comprises at least one of:

receiving an enabling indication from the base station; and a corresponding acknowledgement being received before completing the transmission of the uplink data based on the target number of repeat transmissions during a process of transmitting n consecutive pieces of uplink data, where n is an integer greater than or equal to 1.

9. The method as claimed in claim 7, wherein the second trigger condition comprises at least one of:

receiving a disabling indication from the base station; and a corresponding acknowledgement being not received before completing the transmission of the uplink data based on the target number of repeat transmissions during a process of transmitting m consecutive pieces of uplink data, where m is an integer greater than or equal to 1.

10. A method for transmitting data, performed by a base station, comprising:

receiving uplink data transmitted based on a target number of repeat transmissions by a terminal through a grant-free uplink scheduling mechanism; and transmitting an acknowledgement in response to the uplink data to the terminal in response to successful reception of the uplink data, wherein the acknowledgement in response to the uplink data is received by the terminal based on a first listening parameter, and the first listening parameter comprises listening start time information configured to indicate time of starting to listen for the acknowledgement, wherein the method further comprises:

transmitting a parameter adjustment indication to the terminal, wherein the parameter adjustment indication is configured to indicate the terminal to adjust the first listening parameter for listening the acknowledgement to a second listening parameter.

11. The method as claimed in claim 10, wherein transmitting the acknowledgement comprises:

carrying the acknowledgement through a physical downlink control channel (PDCCH) in response to the successful reception of the uplink data.

12. The method as claimed in claim 10, wherein, the parameter adjustment indication comprises the second listening parameter, or the parameter adjustment indication comprises a parameter offset between the first listening parameter and the second listening parameter.

13. The method as claimed in claim 10, further comprising:

transmitting an enabling indication to the terminal, wherein the enabling indication is configured to indicate the terminal to enable a function of terminating the transmission of the uplink data before completing the transmission of the uplink data based on the target number of repeat transmissions.

14. The method as claimed in claim 10, further comprising:

transmitting a disabling indication to the terminal, wherein the disabling indication is configured to indicate the terminal to disable a function of terminating the transmission of the uplink data before completing the transmission of the uplink data based on the target number of repeat transmissions.

15. A device for transmitting data based on grant-free uplink scheduling, applicable to a terminal, comprising:

a processor; and a memory for storing instructions executable by the processor;

wherein the processor is configured to:

listen, based on a first listening parameter, for an acknowledgement in response to uplink data, the acknowledgement transmitted from a base station during a process of transmitting the uplink data based on a target number of repeat transmissions through a grant-free uplink scheduling mechanism, the acknowledgement being configured to indicate successful reception of the uplink data, wherein the first listening parameter comprises listening start time information configured to indicate time of starting to listen for the acknowledgement;

terminate transmitting the uplink data in response to the acknowledgement being listened before completing the transmission of the uplink data based on the target number of repeat transmissions;

receive a parameter adjustment indication from the base station; and adjust the first listening parameter to a second listening parameter based on the parameter adjustment indication.

16. A device for transmitting data based on grant-free uplink scheduling, applicable to a base station, comprising:

a processor; and a memory for storing instructions executable by the processor;

wherein the processor is configured to perform the method as claimed in claim 10.

17. A non-transitory computer-readable storage medium comprising executable instructions that are called by a processor of a terminal, to perform a method for transmitting data based on grant-free uplink scheduling as claimed in claim 1.

\* \* \* \* \*